United States Patent
Matsumoto et al.

(10) Patent No.: US 6,462,263 B2
(45) Date of Patent: *Oct. 8, 2002

(54) INFORMATION RECORDING MEDIUM AND REPRODUCING APPARATUS THEREFOR

(75) Inventors: Ryuichiro Matsumoto; Dai Ishikawa; Hidekazu Yoshida; Kazuyuki Uchiyama, all of Tokyo (JP)

(73) Assignee: Pioneer Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/253,029

(22) Filed: Feb. 19, 1999

(65) Prior Publication Data

US 2002/0011144 A1 Jan. 31, 2002

(30) Foreign Application Priority Data

Mar. 2, 1998 (JP) .......................................... 10-049419

(51) Int. Cl.⁷ .......................... A63H 5/00; G04B 13/00; G10H 7/00
(52) U.S. Cl. ............................. 84/609; 84/649; 369/65; 369/67; 369/275.1; 369/275.3
(58) Field of Search ................... 84/601–602, 609–610, 84/634, 649–650, 666, 477 R; 434/307 A; 369/58, 65, 67, 275.1, 275.3

(56) References Cited

U.S. PATENT DOCUMENTS

| | | | | |
|---|---|---|---|---|
| 5,541,838 A | * | 7/1996 | Koyama et al. | 364/419.04 |
| 5,747,715 A | * | 5/1998 | Ohta et al. | 884/609 |
| 5,859,821 A | * | 1/1999 | Koya et al. | 369/58 |
| 5,918,303 A | * | 6/1999 | Yamaura et al. | 84/609 |

FOREIGN PATENT DOCUMENTS

JP 6-325547 11/1994 ........... G11B/27/00

* cited by examiner

Primary Examiner—Marlon T. Fletcher
(74) Attorney, Agent, or Firm—Sughrue Mion, PLLC

(57) ABSTRACT

An information recording medium and an information recording medium reproducing apparatus in which a plurality of kinds of character string information can be sorted and displayed from character information which is recorded in a specific area on the information recording medium. A series of character string information including character strings and a delimiter symbol showing a delimiter of the character strings is recorded in the specific area on the information recording medium. The information recording medium reproducing apparatus has a display unit which can divide the character string information into a plurality of character strings on the basis of the delimiter symbol and can display each character string at each of desired positions.

27 Claims, 6 Drawing Sheets

| DISC/TRACK NO. | DISC/TRACK NAME INFORMATION RECORDING PART |
|---|---|
| DISC | A A A A A — — — B CO.,LTD. |
| TRACK 1 | X X X X X X — — — α α α |
| TRACK 2 | Y Y Y Y Y Y — — — β β β |
| TRACK 3 | Z Z Z Z Z Z — — — γ γ γ |
| ⋮ | |

EXAMPLE OF 1ST INFORMATION : X X X X X X
EXAMPLE OF 2ND INFORMATION : α α α
EXAMPLE OF 3RD INFORMATION : L 1, L 2, L 3, · · ·

FIG.3

| | EXAMPLE OF DELIMITER SYMBOL | | | | | |
|---|---|---|---|---|---|---|
| EXAMPLE 1 | 2 OR 3 CONTINUOUS SYMBOLS | -- --- | $$ $$$ | ## ### | %% %%% | && &&& | // /// |
| EXAMPLE 2 | SYMBOLS OBTAINED BY SANDWICHING A SYMBOL BY TWO SAME SYMBOLS | -*- | -+- | -/- | -\|- | -%- | -++ ++- |
| EXAMPLE 3 | SYMBOLS OBTAINED BY ADDING SPECIAL CHARACTER(S) AFTER A SYMBOL | -2 | $1 | #A | &j | $qq | $ DELIMITER |
| EXAMPLE 4 | SYMBOLS OBTAINED BY SANDWICHING THE SYMBOLS SHOWN IN EXAMPLE 1, 2, AND 3 BY SPACES | _--_ _-+_ | _$$$_ _-2_ | _##_ _$1_ | _%%_ | _-*-_ _-\|-_ |

INFORMATION RECORDING MEDIUM AND REPRODUCING APPARATUS THEREFOR

BACKGROUND OF THE INVENTION

1. Field of the Invention

The present invention relates to an information recording medium in which main information pieces such as music data or the like and character information indicative of the contents of the main information pieces are recorded. The invention also relates to a reproducing apparatus for reproducing recorded information by playing the information recording medium.

2. Description of Related Art

Generally, in an information recording medium in which a digital signal is recorded, management information called TOC (Table Of Contents) indicative of an index of the main program data is recorded in an area other than the area in which main program is recorded. For example, in an information recording medium in which a music program is recorded as main program data, the TOC includes information such as time code value and music number of each music piece with respect to all of music pieces recorded in the information recording medium, time code value when all of the recorded music pieces are reproduced, and the like. Furthermore, there is a case where character information such as a name of each of the recorded music pieces and the like is recorded in the TOC area.

By the management information of the TOC as mentioned above, a high speed access such as a search of a head part of each music piece in accordance with a desired order of the operator can be realized when the information recording medium is reproduced by the recording information reproducing apparatus. Especially, in the case of an information recording medium in which character information has been recorded, the character information regarding a music piece which is presently being reproduced can be displayed on an information display unit of the recording information reproducing apparatus.

When the information recording medium in which the character information is recorded in the TOC area is reproduced, conventionally, the character information is displayed in one line as a continuous character string on the information display unit of the recording information reproducing apparatus. Since the width of information display unit is not usually sufficient, character information is often displayed as flowing characters which flow from right to left.

There, however, was a problem that the operator of the apparatus needs some time to read the display contents of the flowing characters. Moreover, in the case of character information including a plurality of kinds of information, it takes time to recognize a delimiter of information, so that there is a problem in operability of a reproducing apparatus in which such character information is displayed.

OBJECT AND SUMMARY OF THE INVENTION

It is therefore an object of the invention to provide an information recording medium which enables displaying a character string representing management information in a manner easily to view and to provide a reproducing apparatus for reproducing such a recording medium.

In order to attain the object, an information recording medium according to the invention is configured so that management information is recorded in a specific area, wherein a character string and a delimiter symbol indicative of a delimiter in the character string are recorded in the specific area.

An information recording medium reproducing apparatus according to the invention is configured to reproduce recording information by playing the information recording medium, wherein the apparatus has a display unit for displaying each of a plurality of character strings divided on the basis of the delimiter symbols at each of desired positions.

According to the invention, from an information recording medium in which a character string and a delimiter symbol indicative of a delimiter of the character string have been recorded in a specific area, the character string and its delimiter symbol are read, the character string is divided into a plurality of character strings, and each of the divided character strings can be displayed at a different position in the display unit.

BRIEF DESCRIPTION OF THE DRAWINGS

FIG. 3 is a diagram showing examples of delimiter symbols in the character string information to be recorded in the information recording medium according to the invention;

DETAILED DESCRIPTION OF THE PREFERRED EMBODIMENTS

Embodiments of the invention will now be described in detail hereinafter with reference to the drawings.

Figures 1, 2:
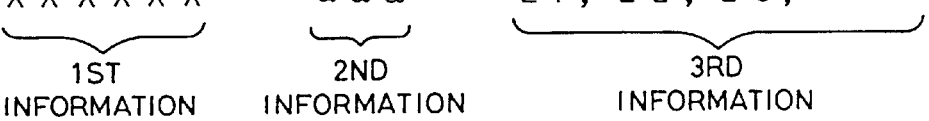
FIG. 1 is a diagram showing an example of character string information recorded as management information in a specific area on an information recording medium according to the invention.
FIG. 2 is a diagram showing an example of a series of character string information to be recorded in the information recording medium according to the invention.

FIG. 1 is a table showing an example of management information recorded in a TOC area on an information recording medium according to the invention. In a column on the left side of a bold line, lines corresponding to a disc and track numbers are sequentially formed in accordance with the order from the top to the bottom in the diagram. In the top line, a character string indicative of the kind of disc or a trade name "AAAAA" and a manufacturer "B Co., Ltd." is written. In the subsequent lines, music names and singer names of music programs of tracks 1 to 3 are sequentially written as "XXXXXX - - - ααα", "YYYYYY - - - βββ", and "ZZZZZZ - - - γγγ".

The number of different character strings (or character groups) which are desired to be recorded in the character information of a desired track is not limited to only two but three or more character strings can be also recorded. For example, in case of a music program, as shown in FIG. 2, character string information including a music name "XXXXXX" as first information, a singer name "ααα" as second information, and comments "L1, L2, L3, . . . " as third information can be recorded as a series of character string information including delimiter symbols.

In the table of FIG. 1, " - - - " is a delimiter symbol. It is sufficient to use a delimiter symbol constructed by a plurality of "-".

FIG. 3 shows examples of delimiter symbols. Example 1 relates to an example in which the delimiter symbol is constructed by arranging a plurality of same kind of symbols of "-", "$ ", "#", "%", "&", "/" or "+".

Example 2 shows a symbol train obtained by sandwiching one symbol by the other two same symbols. Example 3 relates to a symbol character string obtained by adding a specific character after a symbol. Example 4 relates to a symbol character string obtained by sandwiching the character strings shown in Examples 1 to 3 by spaces. It will be readily understood that combinations except for the character strings or symbol trains shown in FIG. 3 can be also used. Not only two or more character strings but also one specific character such as "1", "$", or the like can be used.

Figure 4:
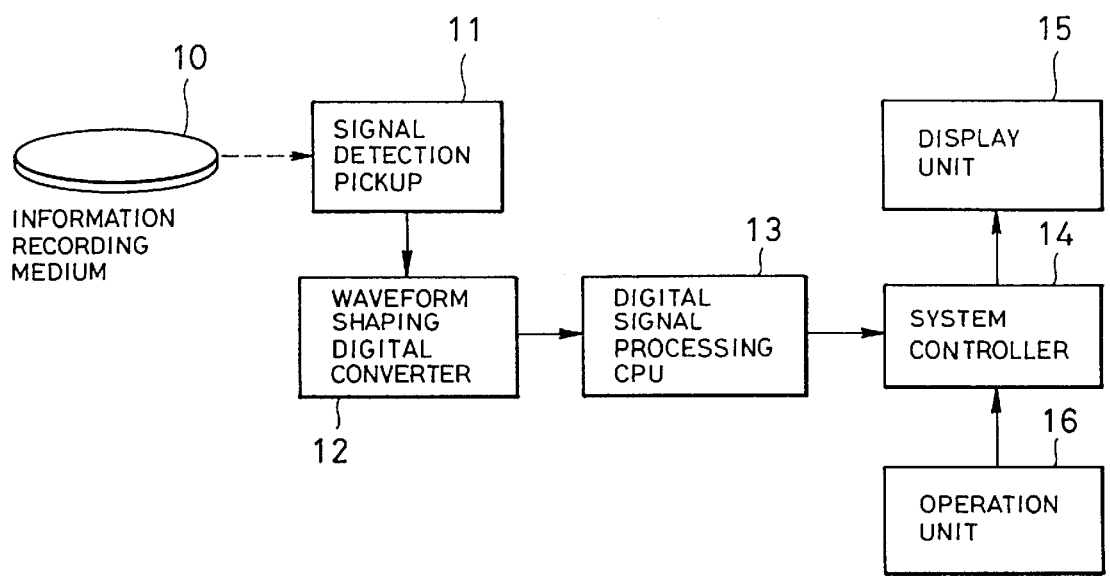
FIG. 4 is a block diagram showing a schematic construction of an information recording medium reproducing apparatus according to the invention.

FIG. 4 shows an information recording medium reproducing apparatus for reproducing recording information by playing an information recording medium on which character information including delimiter symbols as described above is recorded.

In FIG. 4, when an information recording medium 10 is loaded into the information recording medium reproducing apparatus or when a request signal is generated by the operator via an operation unit 16 after that, a character information signal is obtained from the TOC area on the information recording medium 10 via a signal detection pickup 11 and a waveform shaping digital converter 12. The obtained character information signal is divided into a plurality of character strings on the basis of information of the delimiter symbols by a process in a digital signal processing CPU 13, which will be described later. Each of the divided character strings is displayed in a proper display unit 15 via a system controller 14.

Processes in the digital signal processing CPU 13 in the case where the delimiter symbol is constructed by a train of three continuous symbols as shown in Example 1 in FIG. 3 and three character strings are included in the character information recorded in the TOC will be described hereinbelow with reference to FIG. 5.

Figure 5:
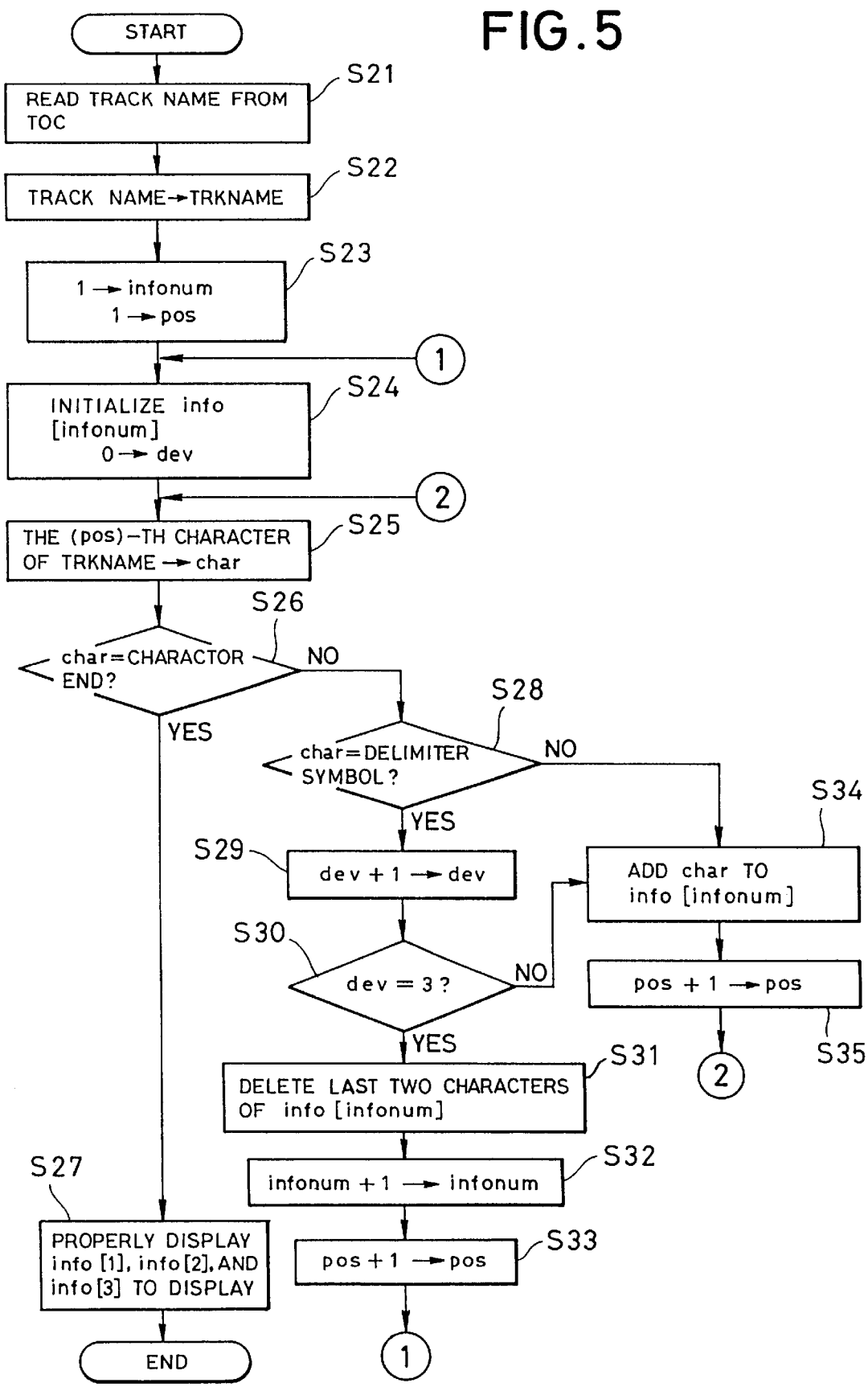
FIG. 5 is a flowchart showing a processing routine of the character string information including delimiter symbols in the invention.

First, in a routine shown in FIG. 5, a disc name of the information recording medium or a track name, that is, a character information train of a desired track which is requested by the operator is read out from the TOC in the information recording medium (step S21). The character information train to be read will be described as a track name hereinbelow. The read track name is stored in TRKNAME (step S22). "1" as an initial value is substituted for infonum indicative of the number of each character string after the division and for pos indicative of the position from the head of the character information train stored in the track name, that is, TRKNAME (step S23). Subsequently, info[ ] into which the character string of the character information string to be divided is stored is initialized and "0" is substituted for dev indicative of the number of continuous delimiter symbols (step S24).

The pos-th character of TRKNAME is stored into char (step S25). A check is made to see if char is character END, namely, a specific symbol showing the end of the selected track name (step S26). When it is determined in step S26 that the character stored in char is not the specific symbol showing the end of the track name, a check is subsequently made to see if the character stored in char is one delimiter symbol among three successive delimiter symbol trains (step S28). When it is decided in step S28 that the character stored in char is the delimiter symbol, "1" is added to dev indicative of the number of continuous delimiter symbols (step S29). A check is made to see if the value of dev after the addition is equal to 3 (step S30). When it is decided in step S28 that the character stored in char is not the delimiter symbol and when it is determined in step S30 that the value of dev is not equal to 3, the character stored in char is added to the infonum-th info[ ] of the character information number, namely, info[infonum] (step S34). "1" is added to the character position pos (step S35). After completion of the process in step S35, the processing routine is returned to step S25 and the process in step S25 is repeated. When the value of dev is equal to 3 in step S30, since three successive delimiter symbols are constructed by the two successive delimiter symbols added to info[infonum] so far and the delimiter symbol stored in char at this time, it is determined that the character position is the dividing position of the character information train. The last two characters which have already been added to info[infonum] are, therefore, deleted (step S31) and it is decided that the character string stored in info[infonum] is the infonum-th character string of the character information number. Subsequently, "1" is added to the character information number infonum and character position pos (steps S32, S33), respectively. The processing routine is returned to step S24 and the process in step S24 is repeated.

The above processes are set to the fundamental repetitive processes and only in the case where it is determined in step S26 that the character stored in char is the specific symbol showing the end of the track name, each of the "infonum" character strings is properly displayed in the display unit by a display format, which will be explained later (step S27).

Although the processes in FIG. 5 described above relate to the case where the delimiter symbols are the three successive symbol trains as shown in example 1 in FIG. 3, processes in the digital signal processing CPU 13 in the cases where the delimiter symbols are symbol trains of patterns as shown in examples 2 to 4 in FIG. 3 will now be described hereinbelow with reference to FIG. 6. In this case as well, it is assumed that three character strings are included in the character information recorded in the TOC.

Figure 6:
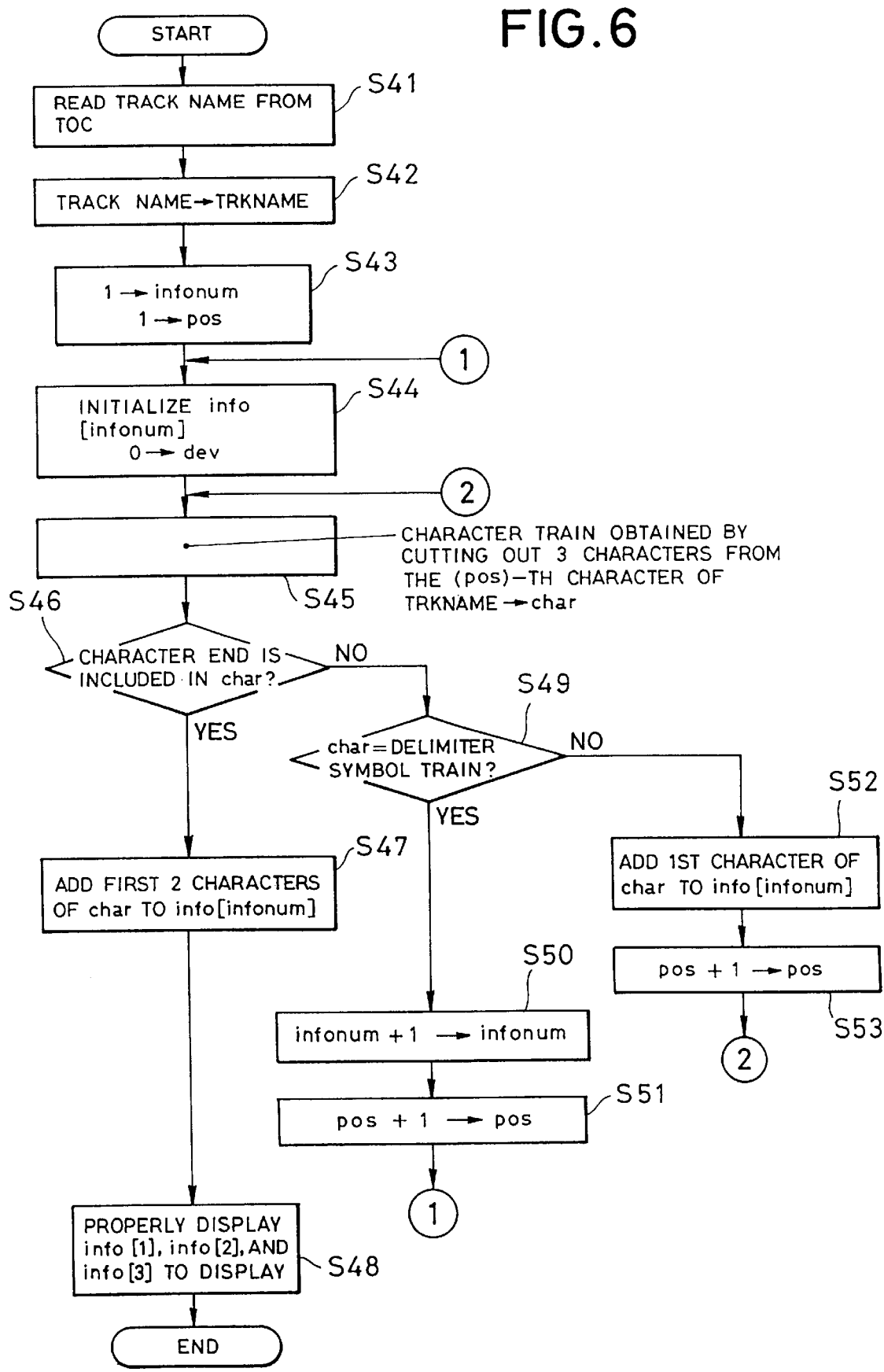
FIG. 6 is a flowchart showing another example of a processing routine of the character string information including delimiter symbols in the invention.

In FIG. 6, since processes in steps S41 to S44 are the same as the processes in steps S21 to S24 in FIG. 5, their descriptions are omitted here.

After completion of the process in step S44, the character string obtained by cutting out three characters from the pos-th character of TRKNAME is stored into char (step S45). A check is made to see if character END, namely, the specific symbol showing the end of the selected track name is included in char (step S46). When it is decided in step S46 that character END is not included in char, a check is subsequently made to see if the character string stored in char is a delimiter symbol train (step S49). When the character string stored in char is not the delimiter symbol train in step S49, the first character of the character string stored in char is added into the infonum-th info[ ] of the character information number, namely, into info[infonum] (step S52). "1" is added to the character position pos (step S53). After completion of the process in step S53, the processing routine is returned to step S45 and the process in step S45 is repeated. When the character string stored in char is the delimiter symbol train in step S49, it is decided that the pos-th position of TRKNAME is the dividing position of the character information train and it is determined that the character string stored in info[infonum] so far is the infonum-th character string of the character information number. Subsequently, "1" is added to the character information number infonum and character position pos (steps S50, S51), respectively. The processing routine is returned to step S44 and the process in step S24 is repeated. The above processes are set to the fundamental repetitive processes. When character END is included in char in step S46, first two characters of the character string stored in char are added into the infonum-th info[ ] of the character information number, namely, into info[infonum]. The infonum-th (in this example, third) character string serving as the last character information number is, thus, decided. Subsequently, each of the "infonum" character strings is properly displayed in the display unit by a display method, which will be explained hereinafter (step S48).

The processes described above in FIGS. 5 and 6 are not limited to those mentioned above but it is sufficient to perform a process such that from a character string comprising a number of characters, a character string can be partially extracted by a specific character (symbol) which is included in the character string and serves as delimiter information. One symbol or character having a specific identification code can be also used as a delimiter symbol.

Figure 7A:
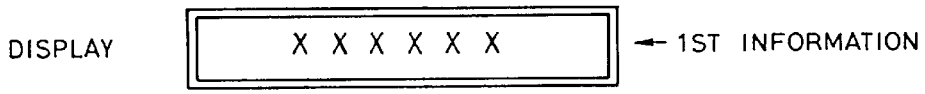
FIGS. 7A to 7E are diagrams showing examples of display formats of the character information in the information recording medium reproducing apparatus according to the invention.
Figure 7B:
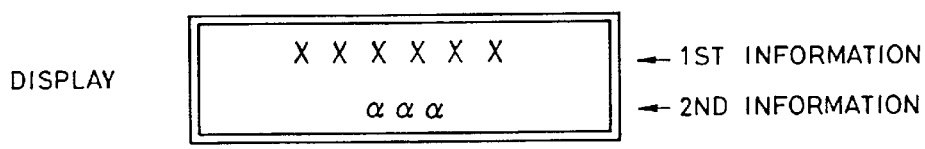
Figure 7C:
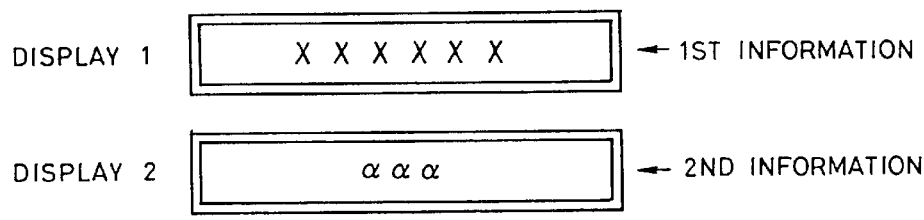
Figure 7D:
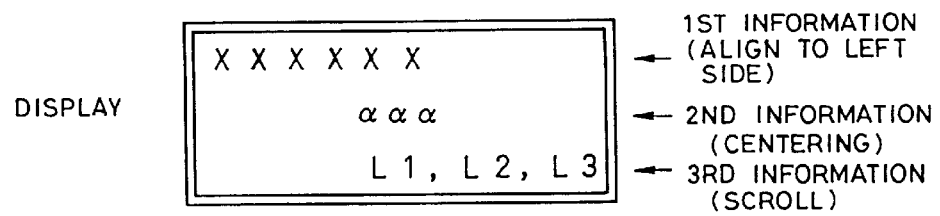
Figure 7E:
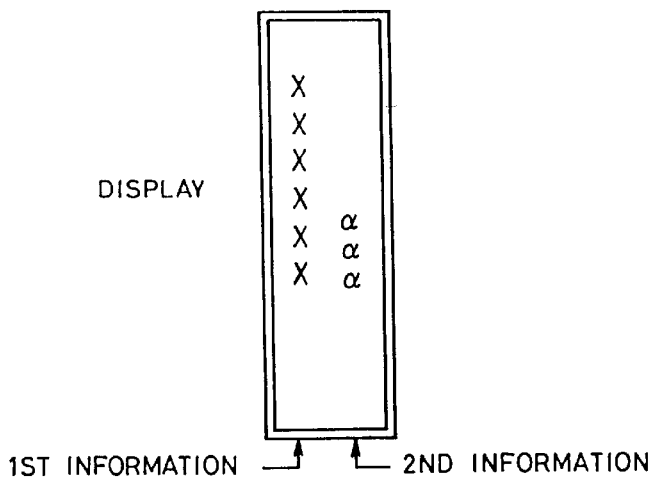

Each of a plurality of character strings divided from the character information train is displayed by various formats as shown in FIGS. 7A to 7E. For example, with respect to each character string divided into three character strings, FIG. 7A shows the example in which only one character string selected from the three character strings is displayed in one display unit. As shown in FIG. 7B, two character strings selected from the three character strings can be displayed in one display unit which can display a plurality of lines. Or, as shown in FIG. 7C, one character string selected from the three character strings can be displayed in each of a plurality of display units. Further, as shown in FIG. 7D, the three character information can be also displayed in one display unit which can display a plurality of lines in a manner such that the first character information is displayed so as to be aligned at the leftmost position (left justification), the second character information is displayed at the center (centering), and the third character information is displayed as a flow character (scroll), respectively. Furthermore, FIG. 7E shows the example in which the character information is displayed as, particularly, a vertical writing display. In this case, each of the display methods of FIGS. 7A to 7D can be applied.

It will be readily understood that a plurality of divided character strings can be displayed in accordance with various display formats except for the foregoing examples of the character information display.

Although the above embodiment has been described with respect to, particularly, the information recording medium on which the music program has been recorded, the invention can be also applied to information of various main recording contents such as image data and dictionary data or computer program and the like.

As described above, according to the information recording medium and its information display apparatus of the invention, a series of character string information recorded in the specific area of the information recording medium is read, a plurality of character strings are obtained on the basis of delimiter information included in the character string information, and those character strings can be sorted and displayed in a lump, so that the operator can instantaneously certainly confirm the information of the main recording contents of the information recording medium by the eyes.

What is claimed is:

1. An information recording medium in which main program data has been recorded and management information has been recorded in a recording area of said information recording medium, wherein a character string and a delimiter symbol have been recorded in said recording area, wherein said delimiter symbol indicates a delimiter between adjacent strings in said character string that are to be displayed on separate lines, and wherein said delimiter symbol is a specific character.

2. A medium according to claim 1, wherein said character string includes:

a plurality of music information segments;

a character string showing the contents of said music information segments; and a character string showing a person's name regarding said music information segments.

3. A medium according to claim 1, wherein said delimiter symbol is a specific character selected from the group of characters consisting of "-", "$", "#", "%", "&", "/", and "+".

4. An information recording medium in which main program data has been recorded and management information has been recorded in a recording area of said information recording medium, wherein a character string and a delimiter symbol have been recorded in said recording area, wherein said delimiter symbol indicates a delimiter between adjacent strings in said character string that are to be displayed on separate lines, and wherein said delimiter symbol is constructed by a specific character string comprising a plurality of characters.

5. A medium according to claim 4, wherein said character string includes:

a plurality of music information segments;

a character string showing the contents of said music information segments; and a character string showing a person's name regarding said music information segments.

6. A medium according to claim 4, wherein said delimiter symbol is a specific character string constituted by a plurality of identical characters.

7. A medium according to claim 4, wherein said delimiter symbol is a specific character string constituted by a center character and a pair of identical characters sandwiching said center character.

8. A medium according to claim 4, wherein said delimiter symbol is a specific character string constituted by a symbol character and at least a character following said symbol character.

9. A medium according to claim 4, wherein said delimiter symbol is a specific character string constituted by a plurality of identical characters and a pair of space signs sandwiching said plurality of identical characters.

10. A medium according to claim 4, wherein said delimiter symbol is a specific character string constituted by a center character, a pair of identical characters sandwiching said center character, and a pair of space signs sandwiching said center character and said identical.

11. A medium according to claim 4, wherein said delimiter symbol is a specific character string constituted by a symbol character, at least one character following said symbol character, and a pair of space signs sandwiching said symbol character and said at least one character.

12. A reproducing apparatus comprising:

an information recording medium in which main program data has been recorded and management information has been recorded in a recording area of said information recording medium, wherein a character string and a delimiter symbol have been recorded in said recording area, wherein said delimiter symbol indicates a delimiter between adjacent strings in said character string that are to be displayed separately;

a signal reading device for reading a recording signal from said information recording medium and forming a read signal;

an extracting device for extracting said character string and said delimiter symbol from said read signal; and a display unit for displaying a plurality of character strings divided on the basis of said delimiter symbol on separate lines of a screen of said display unit if said delimiter symbol is extracted by said extracting device.

13. An apparatus according to claim 12, wherein said desired positions are positions which are different along a direction which traverses a direction of columns of said character strings.

14. An information recording medium in which main program data has been recorded and management information has been recorded in a recording area of said information recording medium, wherein a character string, which has an end code and a delimiter symbol, has been recorded in said recording area, wherein said delimiter symbol indicates a delimiter between adjacent strings in said character string that are to be displayed on separate lines, and wherein said delimiter symbol includes at least a character different from said end code and is inserted into said character string.

15. A medium according to claim 14, wherein said delimiter symbol is a specific character.

16. A medium according to claim 15, wherein said character string includes:

a plurality of music information segments;

a character string showing the contents of said music information segments; and a character string showing a person's name regarding said music information segments.

17. A medium according to claim 15, wherein said delimiter symbol is a specific character selected from the group of characters consisting of "-", "$", "#", "%", "&", "/", and "+".

18. A medium according to claim 14, wherein said delimiter symbol is constructed by a specific character.

19. A medium according to claim 18, wherein said character string includes:

a plurality of music information segments;

a character string showing the contents of said music information segments; and a character string showing a person's name regarding said music information segments.

20. A medium according to claim 18, wherein said delimiter symbol is a specific character string constituted by a plurality of identical characters.

21. A medium according to claim 18, wherein said delimiter symbol is a specific character string constituted by a center character and a pair of identical characters sandwiching said center character.

22. A medium according to claim 18, wherein said delimiter symbol is a specific character string constituted by a symbol character and at least a character following said symbol character.

23. A medium according to claim 18, wherein said delimiter symbol is a specific character string constituted by a plurality of identical characters and a pair of space signs sandwiching said plurality of identical characters.

24. A medium according to claim 18, wherein said delimiter symbol is a specific character string constituted by a center character, a pair of identical characters sandwiching said center character, and a pair of space signs sandwiching said center character and said identical characters.

25. A medium according to claim 18, wherein said delimiter symbol is a specific character string constituted by a symbol character, at least one character following said symbol character, and a pair of space signs sandwiching said symbol character and said at least one character.

26. A medium according to claim 14, wherein said character string includes:

a plurality of music information segments;

a character string showing the contents of said music information segments; and a character string showing a person's name regarding said music information segments.

27. A reproducing apparatus comprising:

an information recording medium in which main program data has been recorded and management information has been recorded in a recording area of said information recording medium, wherein a character string and a means for separating adjacent strings in said character string that are to be displayed separately, have been recorded in said recording area;

a signal reading device for reading a recording signal from said information recording medium and forming a read signal;

an extracting device for extracting said character string and said separating means from said read signal; and a display unit for displaying a plurality of character strings divided on the basis of said separating means on separate lines of a screen of said display unit if said separating means is extracted by said extracting device, wherein said separating means is not displayed.

* * * * *